(12) United States Patent
Hessing

(10) Patent No.: US 6,728,631 B1
(45) Date of Patent: Apr. 27, 2004

(54) DEVICE FOR CODING AND DECODING LOCATIONS

(75) Inventor: Bernd Hessing, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,355
(22) PCT Filed: May 12, 1999
(86) PCT No.: PCT/DE99/01433

§ 371 (c)(1),
(2), (4) Date: May 2, 2001

(87) PCT Pub. No.: WO00/08616

PCT Pub. Date: Feb. 17, 2000

(30) Foreign Application Priority Data

Aug. 4, 1998 (DE) .......................................... 198 35 051

(51) Int. Cl.$^7$ .............................................. G01C 21/00
(52) U.S. Cl. ................... 701/207; 701/228; 342/357.01
(58) Field of Search ................................ 701/200, 201, 701/202, 206, 207, 214, 117, 25, 26, 208; 342/357.01, 357.13

(56) References Cited

U.S. PATENT DOCUMENTS 4,796,189 A    1/1989 Nakayama et al. ......... 701/209

FOREIGN PATENT DOCUMENTS

| DE | 37 18 996 | 12/1988 |
|----|-----------|---------|
| DE | 196 38 515 | 4/1998 |
| EP | 0 261 450 | 3/1988 |
| EP | 0 829 837 | 3/1998 |

*Primary Examiner*—Yonel Beaulieu
(74) *Attorney, Agent, or Firm*—Kenyon & Kenyon

(57) ABSTRACT

A device for coding and decoding locations in a transportation network, providing that information concerning these locations are transmitted from one transmitter to one receiver. In the device, the code is composed of a declaration portion and a coordinate portion corresponding to each coded location. The coordinate portion includes a plurality of coordinate pairs, one coordinate pair representing the coordinates of the coded location stored on the transmitter side and at least one other coordinate pair representing an auxiliary point. The declaration portion includes at least the number of coordinate pairs contained in the coordinate portion, the position of the coordinate pair of the coded location in the coordinate portion, and an indication of the type of coded location. For decoding purposes, locations falling within the tolerance range of the received coordinate pairs are determined in a location database that contains the coordinates, the position at any time on the traffic route and additional location information. Of the specified locations, the ones situated on a common traffic route are selected; and of these selected locations, the one that falls within the tolerance range of the specified coordinate pair can be defined as the decoded location.

10 Claims, 4 Drawing Sheets

DEVICE FOR CODING AND DECODING LOCATIONS

FIELD OF INVENTION

The present invention relates to a device for coding locations in a transportation network, information concerning the locations being transmitted from one transmitter to one receiver, and to a device for decoding received information, which signifies a location on a street and contains a plurality of coordinate pairs, each of which is given a tolerance range and of which at least one specific coordinate pair along with its tolerance range includes the location.

BACKGROUND OF THE INVENTION

In traffic control engineering systems, vehicles exchange information with central systems Via remote data transmission. This information exchange enables different applications, such as emergency call service, or, traffic information service, or, help with directions or dynamic guidance services, to be implemented. The transmission of location information is necessary for all these services. Location information can be used, for example, to depict the positions of vehicles, location and extent of traffic jams and destinations or selected intermediate points of a driving route.

The information exchange can also use intermodal mobility services, which permit linking of different means of transportation, for example, automobile travel and public transportation. In this case, location information would be useful, for example, as an interface between one transport operator and the other.

In the exchange of location information, different degrees of precision are required depending on the particular service. For example, an emergency call service requires a higher degree of precision in the specification of a location than does a traffic information service. In the interplay between a traffic control engineering central system and the vehicles, a unique understanding of the location information is therefore necessary. If, for example, the central system transmits hotel A as the destination for the route of a vehicle, then the vehicle navigation system must not route the vehicle to hotel B.

Because of the ultimately limited capacity of the means of transmission between central system and vehicle, an effective coding of the location information is required. However, a transmission of geographic coordinates by itself is not sufficient since different locations can be found at one geographic position, for example, on bridges or in tunnels. Moreover, not all locations are punctiform; therefore, it is usually necessary to also indicate a direction.

For coded transmission of locations, information used for coding and decoding is contained in read-only-memory in both the vehicle and the central system. For a traffic information service, the transmission of a code "ED73EF5", for example, using a read-only memory within the device can lead to the output of the text "A5 from Basel to Karlsruhe at junction 58 Herbolzheim". For decoding, the location, being addressed must therefore be present in the read-only memory. Additional information that is not required for the decoding itself, for example location names and street numbers, can also be stored for the individual locations, and therefore does not need to be uniquely determined between central system and vehicle. A key-based coding system of that type is, for example, the coding of location information in the TMC system according to CEN ENV 12313-3. An important feature of the location database used in that system is that references are made to adjacent locations. Because of those references, among other things, the maintenance and synchronization of this location database is technically critical. However, received information can only be coded if the same location database has been used for the coding.

SUMMARY OF THE INVENTION

An object of an exemplary embodiment present invention is to specify a device for coding locations that permits decoding of location information in the receiver even for different coding and decoding tables. The exemplary embodiment of the present invention can be used for several of the aforementioned services.

An exemplary embodiment of the present invention provides that: This objective is met according to the present invention in that the coordinate portion includes a plurality of coordinate pairs, one coordinate pair representing the coordinates of the coded location stored on the transmitter side and at least one other coordinate pair representing at least one auxiliary point, and the declaration portion includes at least the number of coordinate pairs contained in the coordinate portion, the position of the coordinate pair of the coded location in the coordinate portion and a type indication of the coded location.

Another exemplary embodiment of the present invention provides that the declaration portion also can contain indications for the type of coding and for tolerances of the coordinate pairs.

In the exemplary embodiment of the present invention, road systems, route networks for various means of transport (rail, bus, plane), rail systems and waterway systems, thus, all networks in which places can be described in relation to each other using geographic coordinates ultimately fall under the meaning of transportation networks. In this context, even locations that belong to different transportation networks can be addressed using the coding according to the present invention.

In another exemplary embodiment of the present invention, a user can be guided on a Saturday morning as to what the fastest route in a pedestrian zone may be, the fast route can incorporate a bus or train into the consideration of the best solution. In addition to established points in the road system, for example addresses or intersections, other types of locations, such as a traffic jam within the road system or a streetcar stop on a streetcar line, may be considered as locations to be coded.

The exemplary embodiment of the present invention also provides that an exactly defined location can be coded in spite of the limited degree of precision of the transmitted coordinates. It is not assumed that the location databases of the transmitter and receiver have an identical structure. All that is required is an assignment to the contents by indicating the geographic coordinates.

A rough similarity of the street elements defined using the step-by-step process of the exemplary embodiment of the present invention is sufficient for decoding. In this context, the depth of detail in the receiver must at least correspond to the depth of detail of the location database of the transmitter. Moreover, the relationships between the points that are assumed on the transmitter side when selecting the points must be reproducible for the receiver. For example, all points can lie on one street. In this case, these streets and the points situated on them must be known in the receiver and in the transmitter. The individual steps in the system according to the exemplary embodiment of the present invention form a maneuver to be performed on the basis of a route description that one would give to a stranger if asked for directions.

When using geographic coordinates, a declaration of the coding to be used is required. In this context the declaration can be performed explicitly or implicitly. In any of the exemplary embodiments of the present invention, the system can precede all location information described by a maneuver with information on the coding used. For this purpose, the declaration portion can be at least semi-permanently stored in the transmitter and in the receiver. A declaration portion of this type can be established, for example, in a standard that is valid for all transmitters and receivers.

In another exemplary embodiment of the present invention the declaration portion can be at least partially transmitted when communication is established between the transmitter and the receiver. Another exemplary embodiment of the present invention can further provide that the declaration portion is at least partially transmitted together with the coordinate portion and temporarily stored in the receiver. In this way, different declarations that are adapted to the particular circumstances can be transmitted from one location coding to another location coding.

One beneficial device for the decoding process includes an exemplary embodiment of a decoder device according to an exemplary embodiment of the present invention can include features that locations falling within the tolerance range of the received coordinate pairs are determined in a location database containing the coordinates, the position at any time on a traffic route and additional information about locations, that of the specified locations those situated on a common traffic route are selected, and that of the selected locations the one that falls within the tolerance range of the specified coordinate pair is defined as the decoded location.

Exemplary embodiments of the present invention are depicted in the drawing using several figures and described hereinafter in further detail.

DETAILED DESCRIPTION

Figure 2:
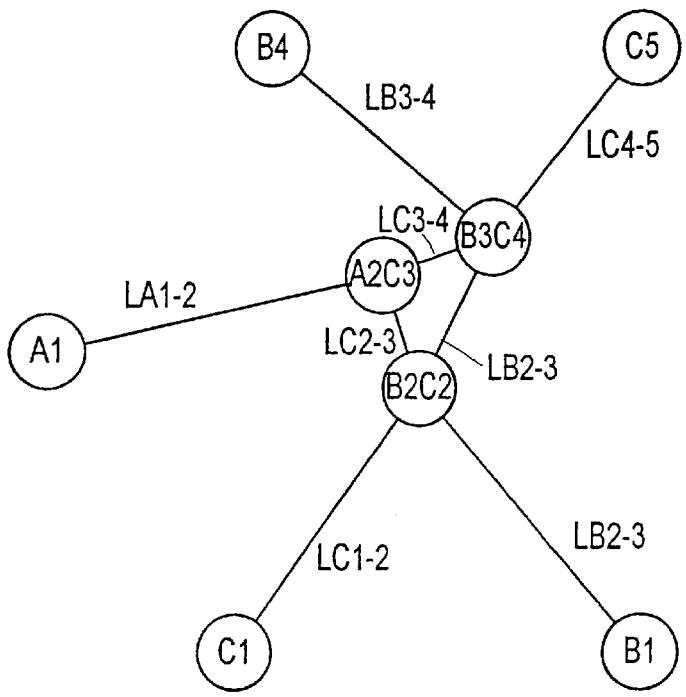
FIG. 2 shows the road system of FIG. 1, without this point.

A digital roadmap, which is represented as a hypothetical example in FIG. 2, is used for the coding and decoding operations. To transmit information that refers, for example, to point A2C3 on street C in driving direction CS, this point must be coded. In this case, a specification of coordinates with relatively large tolerances is assumed. In addition to street C, which runs from C1 through points B2C2, A2C3 and B3C4 to point C5, FIG. 2 shows two other streets, namely a Street A between locations A1 and A2C3 and a Street B between locations B1, B2C2, B3C4 and B4. The sections between the streets are designated using a prefix of L and the indication of the particular locations connected by the street.

Figure 1:
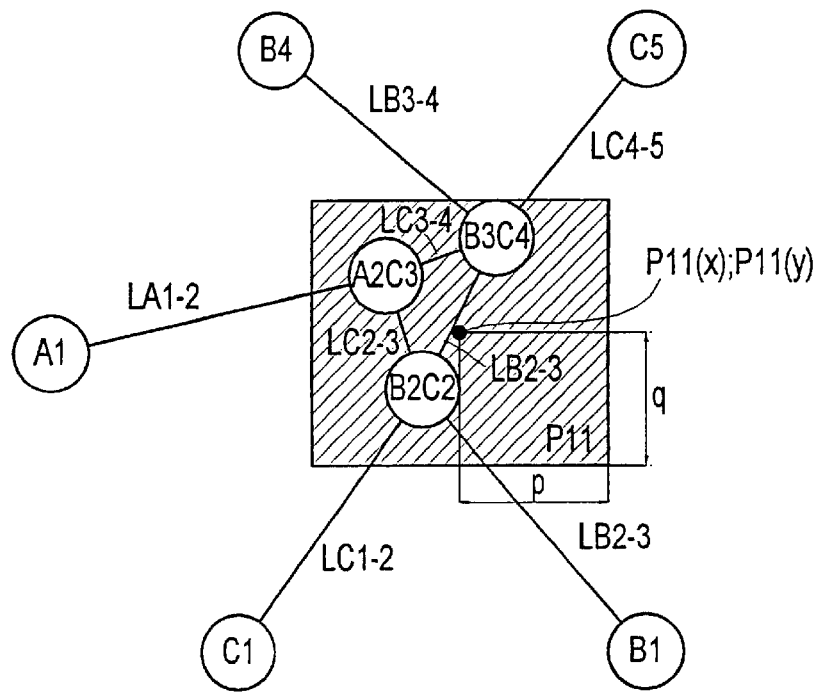
FIG. 1 shows a part of a road system having various locations and a tolerance range of a point transmitted as a coordinate pair using the device according to an exemplary embodiment of the present invention.
Figure 3:
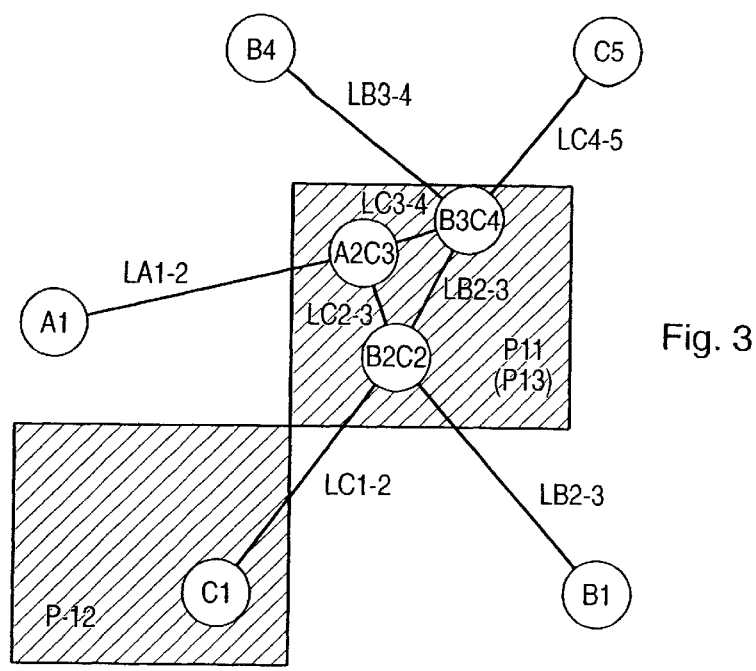
FIG. 3 shows the same part of the road system of FIG. 1, including additional tolerance ranges.

In addition to the road system according to FIG. 2, FIG. 1 shows the tolerance range of a point P11 having the coordinates P11(x); P11(y). This coding alone can be used to determine which of the locations falling within the cross-hatched tolerance range is coded. Therefore an auxiliary point P12 is coded as per FIG. 3, the coordinates of location C1 being used to position it. As the matter stands, it is also possible to use other locations on Street C.

In this way, location B2C2 would first be coded, but its coding yields coordinates identical to those used in the coding of location A2C3. Therefore, an auxiliary point P13 having coordinates identical to those of P11 is then inserted. As a result, location A2C3 can be uniquely coded. Altogether, the coding of location A2C3 includes the following information:

Declaration:
  I. Unit: x, y
  II. Tolerance: plus/minus p, q
  III. Type: point, road system
  IV. Location: third point
  V. Number of coordinate pairs: three Coordinates:
  I. P12(x); P12(y)
  II. P13(x); P13(y)
  III. P11(x); P11(y)

In the case of a digital map in the receiver in which the locations A2C3, B2C3 and B3C4 are coded as one location (A2BnCn), no unique result is produced in the transmission of the three points P12, P13 and P11. This is because more points were transmitted than can be uniquely identified in the receiver. An evaluation of this transmitted coding is therefore not possible, or, depending on the configuration of the receiver, the point A2BnCn could be individually transmitted to the user in conjunction with a message indicating that the received information cannot be evaluated completely.

Figure 4:
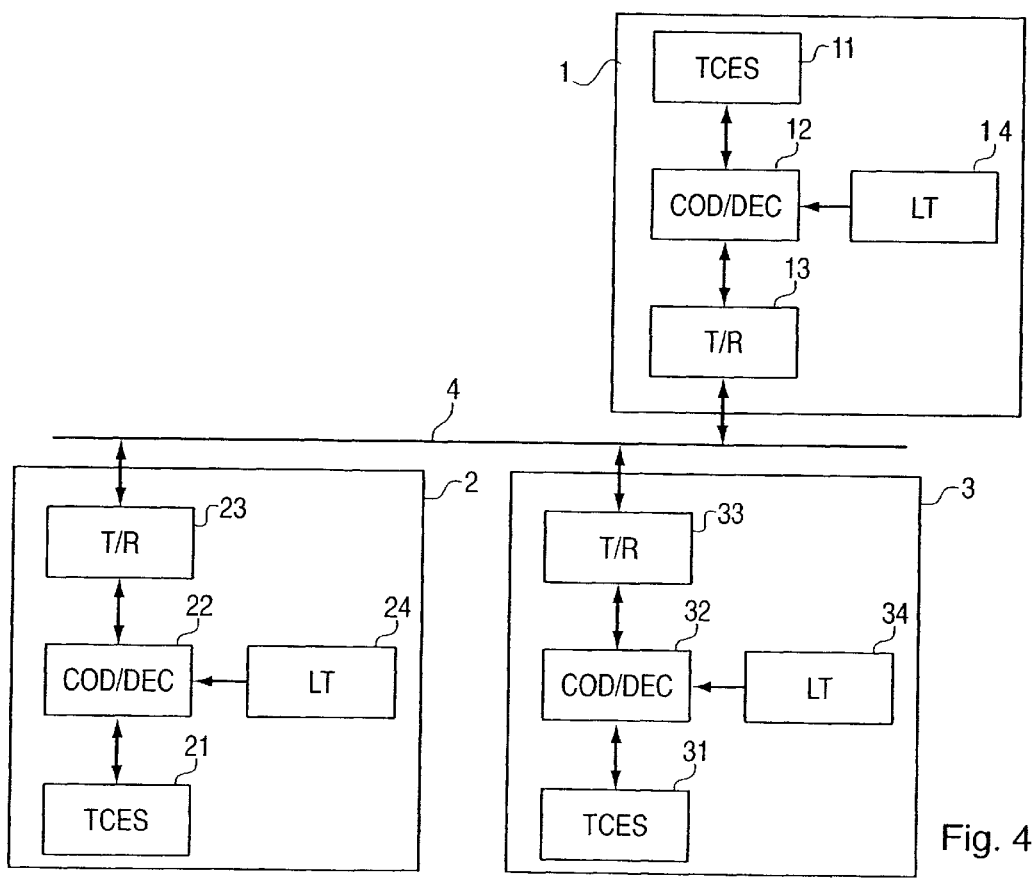
FIG. 4 shows a block diagram of a telematics system according to an exemplary embodiment of the present invention.

FIG. 4 shows a traffic control engineering system in simplified form in which location information coded according to the exemplary embodiment of the exemplary embodiment of the present invention can be exchanged and used. In a central system 1, information that can be outputted and received by a traffic control engineering service (TCES) 11 can be supplied or extracted using a coder/decoder 12 and a transmit/receive device 13 of a long-distance data transmission system 4. To code or decode the location details contained in the information, a location database 14—also called a location table (LT)—is required. Location databases of this type are known, for example, for the aforementioned TMC system and contain information for a location code about the type of location, about adjacent locations on the street in question and the position of the location in the form of a coordinate pair. A wireless cellular network, for example, functions as long-distance data transmission system 4.

Central system 1 can exchange information with many vehicle systems via long-distance data transmission system 4. FIG. 4 shows vehicle devices 2 and 3, each including, respectively, devices 21 and 31 for the traffic control engineering services (TCES), coders/decoders 22 and 32, location databases 24 and 34, and transmit/receive systems 23 and 33. Even though the structures for may appear identical in FIG. 4, as well as the vehicle systems can easily be distinguished from one another. Thus, for example, traffic control services 21 and 31 can have substantial differences, location databases 24 and 34. They can, for example, have a differing degree of detail.

Figure 5:
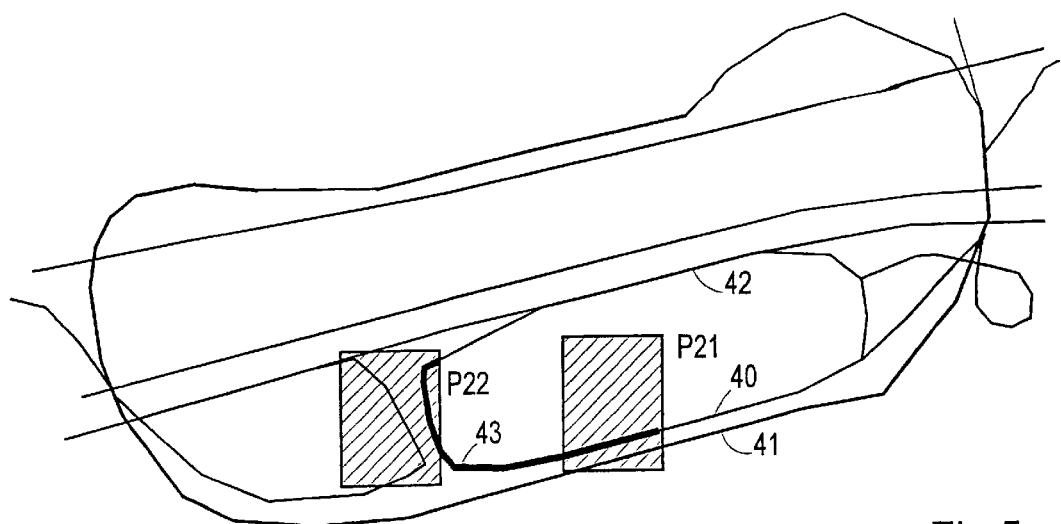
FIG. 5 shows a section from a digital roadmap of an exemplary embodiment of the present invention.

FIG. 5 shows another exemplary embodiment of the present invention in which the destination of the drive is a specific parking lot in the arrivals area of the Frankfurt Airport, Terminal 1. At the Frankfurt Airport, the departures and arrivals areas are arranged one beneath the other and the corresponding traffic lanes are situated one above the other. However, they differ from each other by their respective approach ramps. In FIG. 5, the lanes for departure 41 and arrival 42 situated one above the other, are depicted next to one another. The destination P21 is situated approximately at the geographic position located at 8°34'2.8" east longitude and 50°3'8.7" north latitude. According to a declared deviation of ±3", it is not clear whether one is driving to the arrivals or departures area of the airport. The corresponding tolerance range of P21 is represent by cross-hatching in FIG. 5. Therefore, one more auxiliary point P22 is needed. Approach 43 to the parking lot deviating from the approach to the departures area runs approximately through the point 3°34'7.2" and 50°3'3.1" and is depicted in FIG. 5 with special emphasis. The tolerance range of point 22 is cross-hatched.

To code point P21 and the accompanying parking lot the following are therefore transmitted:

Declaration:
  I. Unit: degrees, angular minutes, tenths-angular seconds
  II. Tolerance: plus/minus three angular seconds
  III. Type: point, road system
  IV. Position: second point
  V. Number of coordinate pairs: two Coordinates:
  I. 8°34'7.2"E; 50°3'8.1"N
  II. 8°34'20.8"E; 50°3-8.7"N A unique solution to the destination can be produced in the digital map of the receiver via the declaration that the punctiform destination P21 is defined with a deviation of ±3". Although the transmitted coordinates are not on the streets of the receiver's map, only the arrival has an association between P21 and P22. The destination is thus uniquely coded. To reduce the quantity of data to be transmitted, the particular difference in relation to the first coordinate pair (delta coordinates) can be transmitted for the second coordinate pair and for any additional coordinate pairs that may exist. In the example, this yields the following coordinate portion:

I. 8°34'7.2"E; 50°3'8.1"N
  II. +1.5 2"; +0.6"

Figure 6:
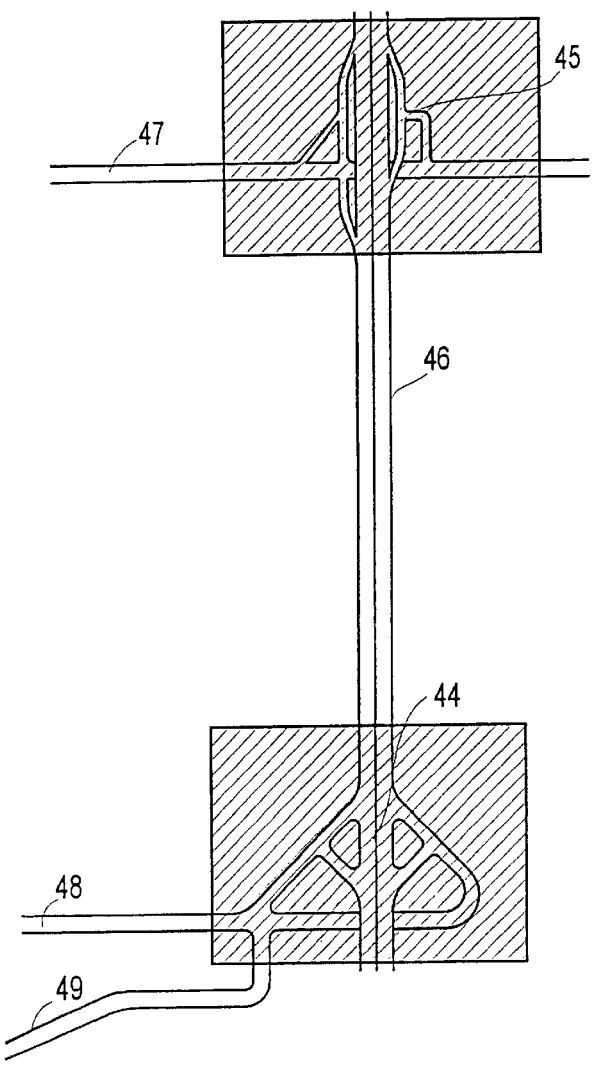
FIG. 6 shows a section from a digital roadmap provided by an exemplary embodiment of the present invention.

FIG. 6 shows another exemplary embodiment of the present invention where a junction 45 of a highway 46 is to be coded for a traffic report. The location databases for decoding the traffic report include a point outside the location (junction 45) on a road 47 with coordinates that are the same as, or at least fall within the tolerance range of, a point on highway 46. In order to uniquely code the junction as a point on highway 46, an additional point, namely adjacent junction 44, can be transmitted as the coordinate pair. However, in the location database used for decoding, this junction can be also listed with two additional streets 48 and 49. However, since they have no relationship to point 45, a unique solution in the receiver can be produced.

Figure 7:
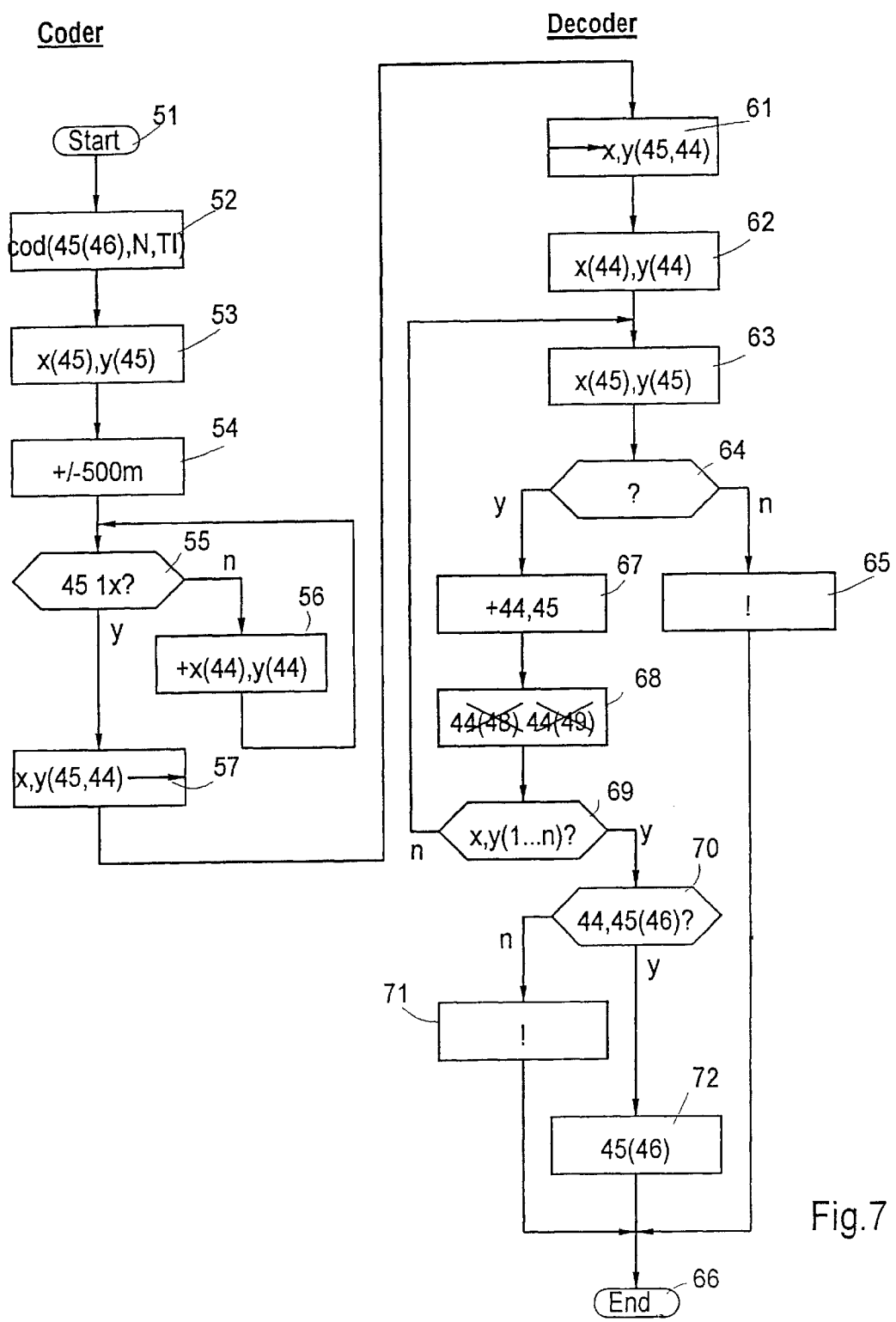
FIG. 7 shows a flow chart of the coding and decoding processes of an exemplary embodiment of the present invention.

FIG. 7 shows another exemplary embodiment of the present invention involving the process of the coding and decoding of junction 45 of (FIG. 6). This process corresponds to programs of processors in the transmitter and receiver. After a start at 51, the job, namely "coding junction 45, driving direction north (N) for traffic information (IT)", is accepted at 52. At 53, the geographic coordinates x(45), y(45) of junction 45 can be read off a digital map or another suitable memory. At 54 the appropriate tolerance for traffic information in connection with highways can be determined, for example ±500 m.

At 55 the program branches according to whether there is a unique solution for the input of coordinates for junction 45. If more than one location having these coordinates is found in the location database of the coder, in this case even the same location on street 47, the program branches in the direction of program part 56, in which the coordinates of the previous location situated on highway 46, namely junction 44, are added. The test can be repeated at 55 using both coordinate pairs. If there is then a unique solution, at 57 the coordinates x(45),y(45) and x(44),y(45) are transmitted to the receiver or decoder. There, the coordinates are received at 61, whereupon at 62 the coordinates of the first point are checked to see if they are present in the location database and a list of the possible candidates, namely junction 44, is set up on each of streets 46, 48 and 49.

After that, at 63 the next point is checked in a corresponding manner and at 64 it is decided whether junction 45 is listed on one or more lists as the next point. If junction 45 is not listed as the next point on any list, then an error is generated at 65. No decoding can take place, whereupon the program is terminated at 66.

Otherwise, junction 45 is added to the list after junction 44 (program part 67). At 68 those list entries in which the point is not included, namely location 44 on streets 48 and 49, are deleted. At 69 the program branches in a manner depending on whether all received coordinate pairs have been checked. If any have not yet been checked, the test is repeated at 63. If all have been checked, the unique solution as to namely whether the list contains only one coordinate string on a street is checked again at 70.

If this is not the case, it is determined at 71 that the point could not be uniquely decoded and the program terminates at 66. However, if there is a unique solution at 70, at 72 the result, namely junction 45 on highway 46, is retained in a suitable manner, in particular temporarily stored in a memory, and depending on the application is also indicated individually or fed to a voice output system.

What is claimed is:

1. A device for at least one of coding and decoding a location in a transportation network, the device being for use with a transmitter system and a receiver system for receiving information associated with the location, the location being transmitted from the transmitter system, the device comprising:

an arrangement for providing a coded location based on a code associated with the location, the code including a declaration portion and a coordinate portion;

wherein:

the coordinate portion includes a plurality of coordinate pairs, at least one coordinate pair of the plurality of coordinate pairs representing the coded location being storable by the transmitter system, and at least another coordinate pair of the plurality of coordinate pairs representing at least one auxiliary point; and the declaration portion includes at least a same number of the coordinate pairs of the plurality of coordinate pairs of the coordinate portion, a position of the at least one pair of the plurality of coordinate pairs representing the coded location, and a type indication of the coded location.

2. The device of claim 1, wherein the type indication of the declaration portion includes at least one of a coded type and at least one tolerance range of the plurality of coordinate pairs.

3. The device of claim 1, wherein the declaration portion is storable at least semi-permanently in the transmitter system and in the receiver system.

4. The device of claim 1, wherein the declaration portion is at least partially transmittable when communication is established between the transmitter system and the receiver system.

5. The device of claim 1, wherein the declaration portion is at least partially transmittable together with the coordinate portion, and the declaration portion is temporarily storable in the receiver system.

6. The device of claim 1, wherein the plurality of coordinate pairs of the coordinate portion are decodable by the receiver system for identifying the coded location.

7. The device of claim 5, wherein received coordinate pairs of the plurality of coordinate pairs of the coordinate portion received by the receiver system refer to points having a common relationship associated with the receiver system.

8. The device of claim 7, wherein in the receiver system, a plurality of points is assignable to a specific tolerance range for selecting one point of the plurality of points having a closest relationship to a preceding auxiliary point and a subsequent auxiliary point.

9. The device of claim 1, wherein the coordinate portion includes the at least one coordinate pair as an absolute value, and the coordinate portion includes any remaining coordinate pairs of the plurality of coordinate pairs as deviations from the at least one coordinate pair.

10. A device for decoding received information signifying a location associated with a traffic route to provide a decoded location, the device comprising:

a location database including any positions on the traffic route and a plurality of coordinate pairs, each coordinate pair of the plurality of coordinate pairs being associated with a respective tolerance range, wherein at least one coordinate pair of the plurality of coordinate pairs includes a code associated with the location, the code including a declaration portion and a coordinate portion; and an arrangement for:

using the location database for determining locations within the respective tolerance range of each of a plurality of received coordinate pairs;

selecting any one of the locations associated with a shared traffic route to provide at least one selected location; and defining the at least one selected location, which is located within the respective tolerance range associated with the at least one coordinate pair, as the decoded location.

\* \* \* \* \*

UNITED STATES PATENT AND TRADEMARK OFFICE
CERTIFICATE OF CORRECTION

PATENT NO. : 6,728,631 B1
DATED : April 27, 2004
INVENTOR(S) : Bernd Hessing

It is certified that error appears in the above-identified patent and that said Letters Patent is hereby corrected as shown below:

Title page,
Item [57], ABSTRACT,
Line 3, change "are transmitted" to -- is transmitted --

Column 1,
Line 18, change "Via" to -- via --
Line 60, change "location, being" to -- location being --

Column 4,
Line 50, change "exemplary embodiment of the exemplary embodiment of" to
-- exemplary embodiment of --

Column 5,
Line 5, change "Even though the structures for may appear identical in FIG. 4, as well as" to -- Even though the structures may appear identical in FIG. 4, as well as --

Signed and Sealed this

Fifth Day of October, 2004

JON W. DUDAS
*Director of the United States Patent and Trademark Office*